United States Patent [19]

Miura et al.

[11] Patent Number: 4,770,460
[45] Date of Patent: Sep. 13, 1988

[54] FRONT FENDER FOR SMALL VEHICLES

[75] Inventors: Tamotsu Miura, Kanagawa; Hisato Saitoh, Saitama, both of Japan

[73] Assignee: Honda Giken Kogyo Kabushiki Kaisha, Tokyo, Japan

[21] Appl. No.: 7,031

[22] Filed: Jan. 27, 1987

[30] Foreign Application Priority Data

Jan. 25, 1986 [JP] Japan .................. 61-8407[U]

[51] Int. Cl.⁴ ............................................ B62J 17/02
[52] U.S. Cl. .................... 296/78.1; 296/1 S; 280/152.2
[58] Field of Search ............... 296/78.1, 1 S; 280/152.1, 152.2, 152.3, 279

[56] References Cited

U.S. PATENT DOCUMENTS

| | | | |
|---|---|---|---|
| 4,010,976 | 3/1977 | Shields | 296/78.1 |
| 4,457,552 | 7/1984 | Katsuoka | 296/1 S |
| 4,458,909 | 7/1984 | Morioka | 296/1 S |

Primary Examiner—Robert R. Song
Attorney, Agent, or Firm—Lyon & Lyon

[57] ABSTRACT

A small motor vehicle such as a motorcycle having a front fairing with the radiator, engine and the like positioned therein. A front fender is provided which includes a peripheral portion positioned about a portion of the front wheel and extending fore-and-aft between the struts of a front fork. The fender further includes side plates including narrow upper portions extending to just outwardly of the front fork and lower portions. The lower portions extend outwardly and rearwardly to lie in a streamline aligned with the lower sides of the vehicle fairing. Further edge portions extend downwardly from the peripheral portion of the fender rearwardly of the front fork so as to create an appropriate fender well.

4 Claims, 2 Drawing Sheets

FRONT FENDER FOR SMALL VEHICLES

BACKGROUND OF THE INVENTION

The field of the present invention is fenders for small vehicles such as motorcycles, motor tricycles and the like.

On small motorized vehicles such as motorcycles, motor tricycles, scooters and the like, a front wheel is supported and arranged in the center portion of the front of the vehicle and, frequently, a front fender is provided over that front wheel as a mud guard. Such fenders extend about a portion of the outer periphery of the front wheel, covering the upper portion thereof to prevent the throwing of mud and the like. Some such vehicles also employ a fairing which covers the front portion of the vehicle body and may extend down a portion of the sides thereof. Inwardly of the fairing, such heat generating parts as an engine, a radiator, an air cooler and exhaust pipes may be positioned. Consequently, air inlets or air scoops are provided with fairings which are located behind the front wheel and forwardly of the heat generating parts. In this way, air is directed into the fairing to cool the components of the vehicle.

Placement of the air intake or air scoop rearwardly of the front wheel may not be sufficiently effective because the air flow may be disrupted by the rotating front wheel. Air flow regulating plates have been provided which are arranged such that they are inclined from the front to the rear for directing air flow toward the engine and other components. Such a design is illustrated in Japanese Utility Model Publication No. 59-143886 (143886/1984). Such a solution addresses the problem of providing sufficient cooling to the engine. However, minimizing air resistance of the overall vehicle is not provided by such a system.

SUMMARY OF THE INVENTION

The present invention is directed to a front fender for small vehicles employed in conjunction with a fairing to provide for both adequate cooling of the heat generating components within the fairing and minimal air flow resistance to the overall vehicle. To this end, the fender may be configured to include a peripheral portion extending along an outer portion of the periphery of the front wheel. Side plates may extend from the peripheral portion to define a narrow upper portion and a wide lower portion for the fender. The wide lower portion may be aligned with the fairing such that a rearward projection of the plane of each lower portion would be aligned with a side of the associated fairing. In this way, air flow about the peripheral portion and about the upper portions may be directed to the heat generating components of the vehicle while air flow across the lower portion would move rearwardly along the fairing without creating substantial resistance.

In a further aspect of the present invention, the side plates of the fender are configured to extend outwardly of a front fork so as to improve streamlining. Rearwardly of the front fork, the edge portions may be associated with the peripheral portion to define a continuing fender well for the front wheel.

Accordingly, it is an object of the present invention to provide an improved fender construction for small vehicles. Other and further objects and advantages will appear hereinafter.

DETAILED DESCRIPTION OF THE PREFERRED EMBODIMENT

Figure 1:
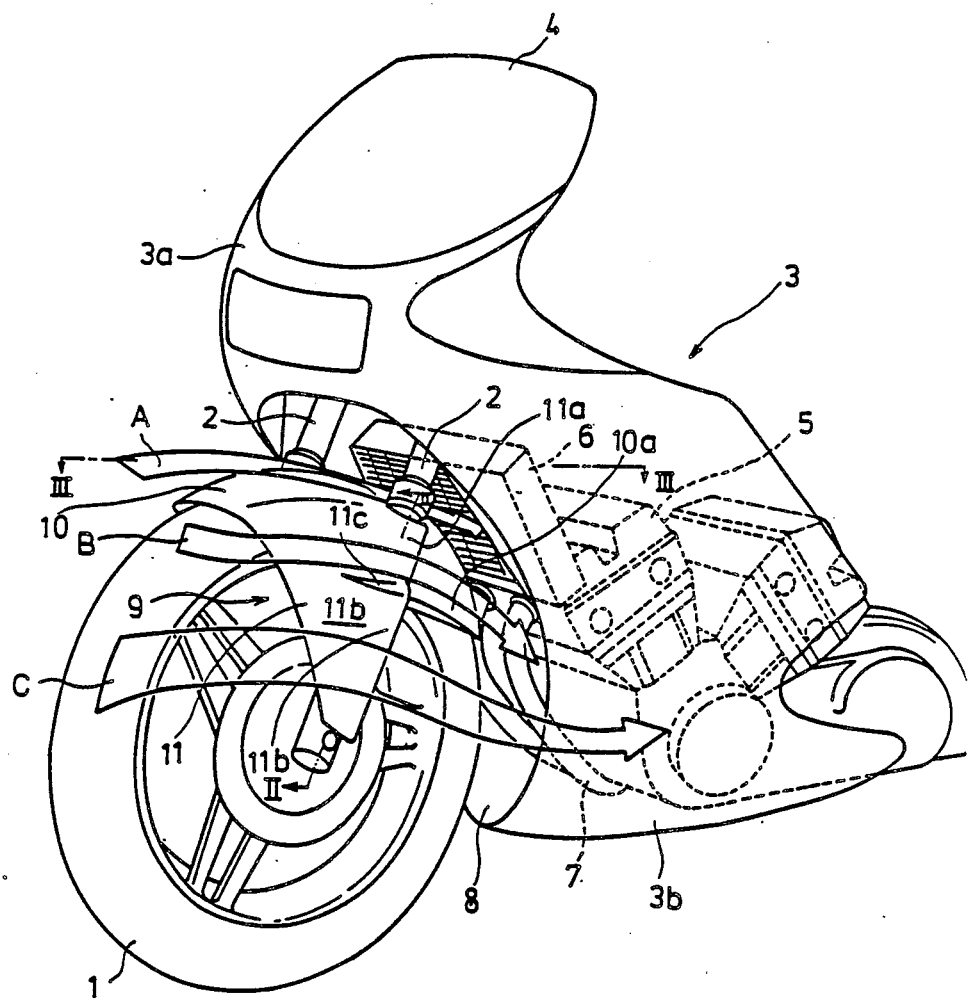
FIG. 1 is an oblique view of a forward portion of a motorcycle employing the present invention.

Turning in detail to the drawings, the front portion of a motorcycle is illustrated in FIG. 1. The motorcycle includes a front wheel 1 which is rotatably supported by a front fork 2 having two struts extending downwardly to the hub of the wheel 1. The wheel 1 is steerably connected to the vehicle through the front fork 2. The front portion of the vehicle body is covered by a fairing 3. The upper portion 3a of the fairing 3 extends over the upper portion of the front wheel 1 and extends downwardly and rearwardly to cover the forward sides of the vehicle. A wind screen 4 is provided at the upper edge portion of the upper portion 3a. A lower portion 3b of the fairing 3 covers the vehicle to the rear of the front wheel 1 and also extends to either side of the vehicle.

Within the lower portion 3b of the fairing 3 there is provided an engine 5 and a radiator 6. An exhaust pipe 7 is coupled to the exhaust port of the engine 5 and extends downwardly and then rearwardly to a muffler (not shown) provided at the rear of the vehicle body.

At the front of the lower portion 3b there is an air inlet 8 through which air flow enters into the fairing 3 resulting from forward motion of the vehicle. The air flow entering the fairing 3 serves to cool the heat generating parts such as the engine 5, the radiator 6, the exhaust pipe 7 and the like.

The front fork 2 projects downwardly and forwardly from the fairing through the air inlet 8 to support the front wheel 1 forwardly of the air inlet opening. On the front fork 2 a front fender 9 is mounted about the front wheel 1, forwardly of the air inlet 8. The front fender 9 covers the upper portion of the front wheel 1 along an outer periphery thereof. The front fender 9, as shown in the figures, is provided with a peripheral plate portion 10 which passes between the struts of the front fork 2. The peripheral plate portion 10 extends longitudinally fore-and-aft about the outer periphery of the wheel 1. Extending oppositely from the peripheral portion 10 are two side plates 11. The side plates 11 extend downwardly from the peripheral portion 10 forwardly of the front fork 2 along the sides of the front wheel 1. The side plates 11 further extend rearwardly around the outer side of the front fork 2.

Figure 2:
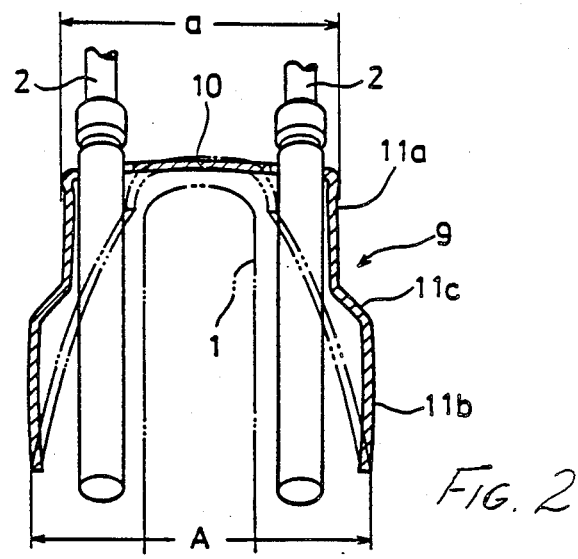
FIG. 2 is a cross-sectional view taken along lines II—II of FIG. 1.
Figure 3:
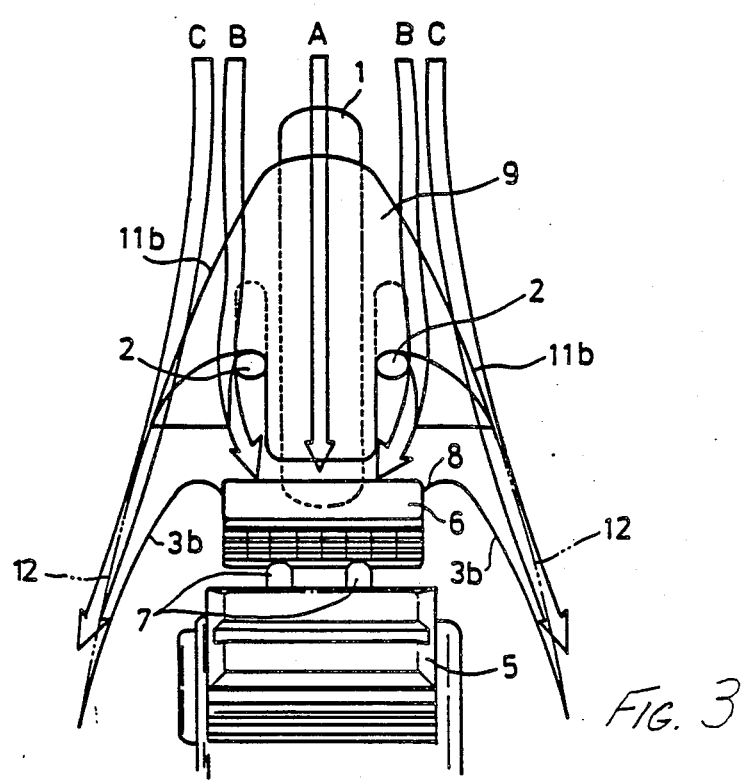
FIG. 3 is a cross-sectional plan view taken along lines III—III of FIG. 1.

The side plates 11 may be considered as each including an upper portion 11a which lies close to the outer portion of the front fork. A lower portion 11b of each side plate 11 is positioned below the upper portion 11a and extends outwardly of the upper portion from forwardly of the fork 2 to well behind the front fork 2. The width between lower portions 11b is illustrated in FIG. 2 as width "A". By comparison, this width is greater than the width 37 a" of the upper portions. A side surface of each lower portion 11b extends in a direction such that a rear projection of the surface lower portion 11b extends in a plane 12, as seen in FIG. 3, smoothly intersecting the fairing 3. Thus, a streamlined plane is defined as including both the lower side surfaces 11b and the lower surface portion 3b of the fairing 3.

On the portion of the fender constituting the peripheral portion 10 rearwardly of the front fork, edge portions 10a extend along the side of the wheel 1 therefrom. Thus, a full fender well is created rearwardly of the front fork 2.

Arrows in FIGS. 1 and 3 illustrate the flow of air near the front fender 9 during forward motion of the vehicle. The arrow A indicates the flow of air above the peripheral portion 10. The air flow A follows the surface of the peripheral portion 10 passing through the struts of the front fork 2 to be introduced to the radiator 6 through the air inlet 8. The air flow indicated by arrows B passes to either side of the peripheral portion 10 and is guided by the side surfaces of the narrowly formed upper portions 11a of the fender 9. As shown in FIGS. 1 and 3, this flow passes closely exteriorly of the struts forming the front fork 2. This flow can then pass to the radiator 6 by way of the inlet 8. A step portion 11c further guides the air flowing past the upper portions 11a. Thus, the flow between the forks illustrated by arrow A and to either side of the forks in the upper portion of the vehicle indicated by arrow B provide air flow to the radiator 6, the exhaust pipe or pipes 7 and the engine 5. In this way, adequate flow is taken in through the air intake 8 for the effective cooling of the vehicle. The air flow indicated by arrow C flows lower down about the fender, being guided by the lower portions 11b of the side plates 11. This air is directed somewhat outwardly and in alignment with the lower portion 3b of the fairing 3. Consequently, the air flow indicated by arrow C flows in streamlines first, around the lower fender portions 11b and that directed by the lower portion 3b of the fairing around the vehicle. Accordingly, eddies may be reduced between the fender and the fairing.

Employing the foregoing configuration, both adequate cooling air to the internal components to the motorcycle inwardly of the fairing may be obtained along with smooth, low resistant flow along the outside of the vehicle. Furthermore, the front fender as set forth here is of relatively simple shape and easily manufactured. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. For use of a small vehicle having a frame, a fairing enclosing at least the forward portion of said frame and a front wheel steerably and rotatably mounted to said frame, the combination comprising:

a fender for said front wheel including a peripheral portion concentrically spaced from the periphery of said wheel, and oppositely spaced side plates extending from said peripheral portion on opposite sides of said wheel, said side plates each having an exterior surface effective to direct air in a substantially unbroken stream to said fairing when said front wheel is disposed for forward movement of said vehicle;

said fairing including an opening defining an air inlet in the forward portion thereof, and said exterior surfaces of said side plates being divided into vertically spaced surface portions, one of which being effective to direct air in a substantially unbroken stream to said fairing when said front wheel is disposed for forward movement of said vehicle and another of which is effective to direct a flow of air through said air inlet into the interior of said fairing enclosure.

2. The combination according to claim 1 in which said another surface portion on each said side plate is positioned vertically above said one surface portion thereon.

3. The combination according to claim 2 including a plurality of heat generating parts of said vehicle mounted on said frame within said enclosure, said another surface portions on said side plates being operative to direct a flow of air in heat tansfer relation to said heat generating parts.

4. The combination according to claim 3 including a front fork for mounting said front wheel to said frame, said side plates being disposed laterally outwardly of said front fork with said one surface portions of said side plates being disposed to a greater lateral extent from said front fork than said another surface portions thereof.

* * * * *